United States Patent
Omeragic et al.

(10) Patent No.: US 10,481,290 B2
(45) Date of Patent: Nov. 19, 2019

(54) GENERALIZED DIRECTIONAL MEASUREMENTS AND USING SYMMETRIZED AND ANTI-SYMMETRIZED ANGLES TO INDICATE ORIENTATION OF ANISOTROPY AND FORMATION BOUNDARIES

(71) Applicant: Schlumberger Technology Corporation, Sugar Land, TX (US)

(72) Inventors: Dzevat Omeragic, Lexington, MA (US); Chih-Hao Kuo, Taipei (TW)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 216 days.

(21) Appl. No.: 15/325,513

(22) PCT Filed: Jul. 10, 2015

(86) PCT No.: PCT/US2015/040004
§ 371 (c)(1),
(2) Date: Jan. 11, 2017

(87) PCT Pub. No.: WO2016/007893
PCT Pub. Date: Jan. 14, 2016

(65) Prior Publication Data
US 2017/0160424 A1    Jun. 8, 2017

Related U.S. Application Data

(60) Provisional application No. 62/023,644, filed on Jul. 11, 2014.

(51) Int. Cl.
*G01V 3/28*   (2006.01)
*G01V 3/38*   (2006.01)
(Continued)

(52) U.S. Cl.
CPC .............. *G01V 3/28* (2013.01); *E21B 47/024* (2013.01); *E21B 47/02216* (2013.01);
(Continued)

(58) Field of Classification Search
CPC .. G01V 3/28; G01V 3/38; E21B 49/00; E21B 47/02216; E21B 47/082; E21B 47/024; E21B 47/18
(Continued)

(56) References Cited

U.S. PATENT DOCUMENTS 4,072,200 A * 2/1978 Morris ...................... E21B 7/04
                                                         175/45
4,107,597 A    8/1978 Meador et al.
(Continued)

OTHER PUBLICATIONS

Born et al., Principles of Optics—Electromagnetic theory of propagation interference and diffraction of light, 6th edition, Pergamon Press, 1980. pp. 23-36.
(Continued)

*Primary Examiner* — Giovanni Astacio-Oquendo

(57) ABSTRACT

A method for determining orientation of an electrical resistivity boundary in a wellbore includes using measurements of an electromagnetic property of formations traversed by the wellbore at at least one axial spacing between a multiaxial electromagnetic transmitter and a multiaxial electromagnetic receiver, and determining a symmetrized angle using measurements of the electromagnetic property made using receiver components transverse to a well logging instrument axis and a transmitter component along the axis. At least a relative orientation of the electrical boundary with respect to an orientation of the well logging instrument is determined using the symmetrized angle.

20 Claims, 18 Drawing Sheets

(51) Int. Cl.
*E21B 47/022* (2012.01)
*E21B 47/024* (2006.01)
*E21B 47/08* (2012.01)
*E21B 49/00* (2006.01)
*E21B 47/18* (2012.01)

(52) U.S. Cl.
CPC .............. *E21B 47/082* (2013.01); *E21B 49/00* (2013.01); *G01V 3/38* (2013.01); *E21B 47/18* (2013.01)

(58) Field of Classification Search
USPC .................................. 324/339, 338, 334, 323
See application file for complete search history.

(56) References Cited

U.S. PATENT DOCUMENTS

| | | | |
|---|---|---|---|
| 4,933,640 A * | 6/1990 | Kuckes ............. | E21B 47/02216 166/66.5 |
| 6,594,584 B1 | 7/2003 | Omeragic et al. | |
| 6,617,972 B2 * | 9/2003 | Takarada ........... | G08B 21/0484 324/538 |
| 6,798,208 B2 | 9/2004 | Omeragic et al. | |
| 6,924,646 B2 | 8/2005 | Omeragic et al. | |
| 6,937,021 B2 | 8/2005 | Rosthal | |
| 6,969,994 B2 | 11/2005 | Minerbo et al. | |
| 7,536,261 B2 | 5/2009 | Omeragic et al. | |
| 8,200,437 B2 | 6/2012 | Davydycheva et al. | |
| 8,489,375 B2 | 7/2013 | Omeragic et al. | |
| 8,779,729 B2 * | 7/2014 | Shiraishi ............... | G06F 1/3212 320/155 |
| 2002/0062992 A1 * | 5/2002 | Fredericks ............. | E21B 47/00 175/40 |
| 2003/0071626 A1 | 4/2003 | Omeragic et al. | |
| 2003/0085707 A1 | 5/2003 | Minerbo et al. | |
| 2010/0082255 A1 | 4/2010 | Davydycheva et al. | |
| 2012/0098518 A1 * | 4/2012 | Unagami ............. | G01R 22/066 324/74 |
| 2012/0286790 A1 | 11/2012 | Yang et al. | |
| 2013/0160998 A1 | 6/2013 | Auzerais et al. | |

OTHER PUBLICATIONS

Li et al., "New directional electromagnetic tool for proactive geosteering and accurate formation evaluation while drilling," paper presented at the 46th SPWLA Annual Symposium, New Orleans, LA, Jun. 26-29, 2005.
Omeragic et al., Sensitivities of Directional Electromagnetic Measurements for Well Placement and Formation Evaluation While Drilling; 76th SEG Annual Meeting, New Orleans, LA, 2006.
International Search Report and Written Opinion issued in corresponding International Application PCT/US2015/040004 dated Oct. 16, 2015. 12 pages.

* cited by examiner

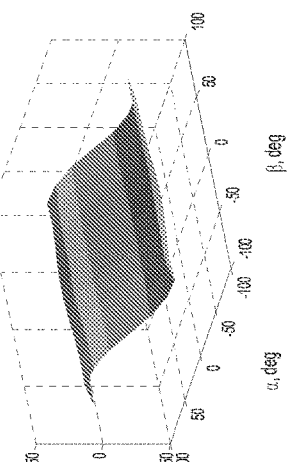
FIG. 7A
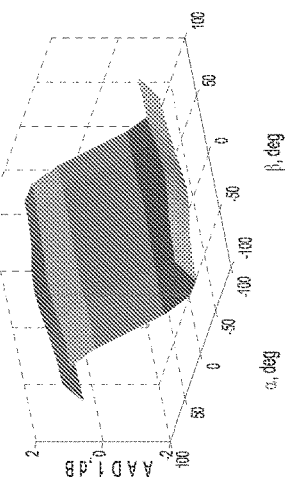
FIG. 7B
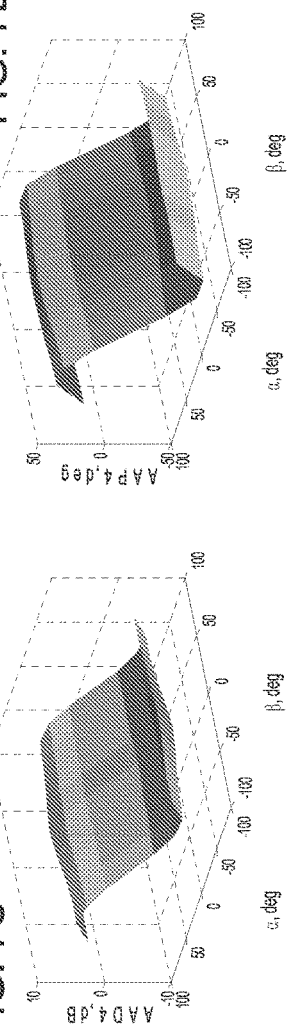
FIG. 7C
FIG. 7D
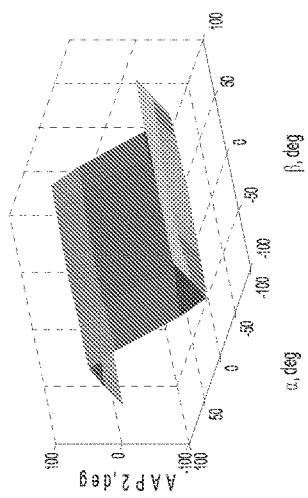
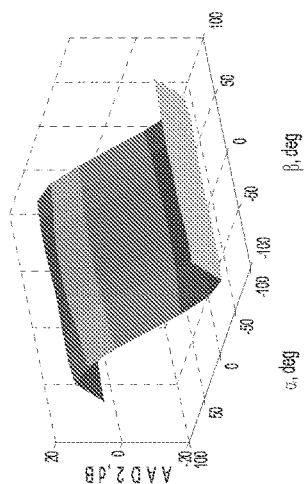
FIG. 7E
FIG. 7F

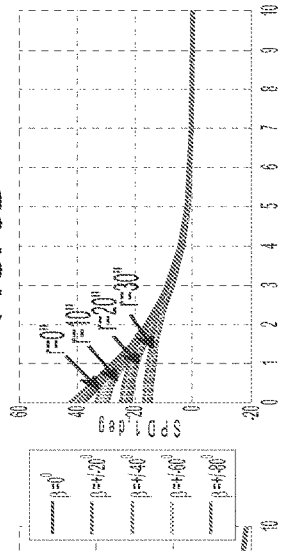
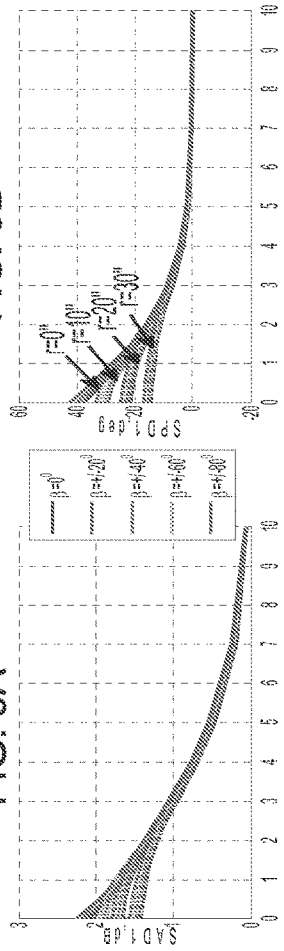
FIG. 9A
FIG. 9B
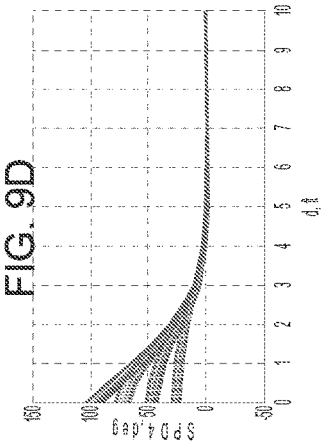
FIG. 9C
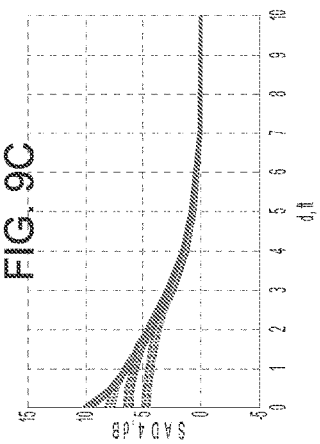
FIG. 9D
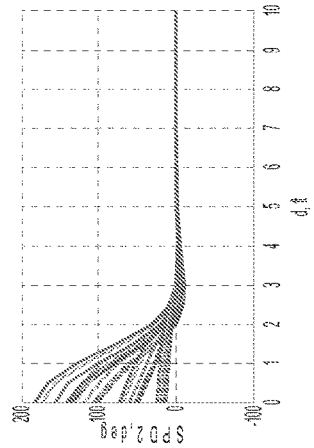
FIG. 9E
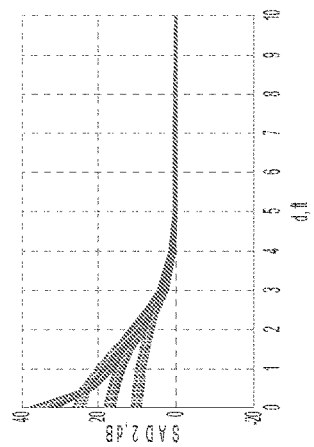
FIG. 9F

GENERALIZED DIRECTIONAL MEASUREMENTS AND USING SYMMETRIZED AND ANTI-SYMMETRIZED ANGLES TO INDICATE ORIENTATION OF ANISOTROPY AND FORMATION BOUNDARIES

CROSS-REFERENCE TO RELATED APPLICATIONS

The current application claims priority to U.S. Provisional Patent Application Ser. No. 62/023,644 filed Jul. 11, 2014, the entirety of which is included by reference.

STATEMENT REGARDING FEDERALLY SPONSORED RESEARCH OR DEVELOPMENT

Not applicable.

BACKGROUND

This disclosure is related to the field of electromagnetic induction well logging. More specifically, the disclosure relates to methods for processing multiaxial electromagnetic induction measurements to obtain orientation of electrical anisotropy and formation layer boundaries.

FIG. 2 schematically illustrates such a tri-axial tool 10 and the component tensor measurement C. The instrument 10 may include one or more multi-axial electromagnetic transmitters T disposed on the instrument 10, and have one or more multi-axial electromagnetic receivers (each receiver usually consisting of a main receiver RM and a balancing or "bucking" receiver RB to attenuate direct induction effects) at one or more axially spaced apart positions along the longitudinal axis z of the tool 10. An instrument sold under the trademark RT SCANNER, which is a trademark of Schlumberger Technology Corporation, Sugar Land, Tex., uses triaxial transmitters and receivers, wherein the transmitters and receivers have three, mutually orthogonal coils having magnetic dipole axes oriented along the tool axis z and along two other mutually orthogonal directions shown at x and y. The instrument measurements in the present example may be obtained in the frequency domain by energizing the transmitter T with a continuous wave (CW) alternating current having one or more discrete frequencies (using more than one discrete frequency may enhance the signal-to-noise ratio). However, measurements of the same information content may also be obtained using time domain signals through a Fourier decomposition process by energizing the transmitter T with one or more types of transient currents. This is a well-known physics principle of frequency-time duality. Voltages induced in each coil of one of the receivers RM/RB is shown in the tensor C represented by the voltage V with a two letter subscript as explained above representing the axis (x, y or z) of the transmitter coil used and the axis of the receiver coil (x, y or z) used to make the particular voltage measurements. The voltage measurements in tensor C may be processed to obtain the described apparent conductivity tensors. Subsurface formation properties, such as horizontal and vertical conductivities ($\sigma h$, $\sigma v$) or their inverse, horizontal and vertical resistivities (Rh, Rv), relative dip angle ($\theta$) and the dip azimuthal direction ($\phi$), as well as borehole/tool properties, such as drilling fluid (mud) conductivity (amud), wellbore diameter (hd), tool eccentering distance (decc), tool eccentering azimuthal angle ($\psi$), all affect the measurements of voltages used to determine the conductivity tensors. Multi-axial induction well logging instruments known in the art may include one or more transmitters of the type shown in FIG. 2 and a plurality of receivers such as shown in FIG. 2, each at a different longitudinal spacing (i.e., along the z axis or longitudinal axis of the instrument).

A corresponding multi-axial electromagnetic measurement system may be implemented in a logging while drilling (LWD) instrument. In LWD instruments, the receivers may be implemented by spaced apart tilted or transverse coil sets disposed on the exterior of a drill collar. Rather than measuring amplitude and phase of induced voltages in the receiver, an amplitude reduction or ratio of the detected voltage in the spaced apart coil sets may be measured, as well as a phase shift in the detected voltage between the receiver coil sets. An example LWD instrument is sold under the trademark PERISCOPE, which is also a trademark of Schlumberger Technology Corporation.

Measurements known in the art for determining direction of and distance to boundaries between formation layers having different electrical conductivities, and/or resistivity anisotropy and its orientation are based on the property of XZ−ZX and XZ+ZX couplings (symmetrized and antisymmetrized directional voltage measurements) that enhance or reduce sensitivity to bed boundaries or formation anisotropy and dip [see references 1,2 and 3]. These properties (removal or amplification of dip and anisotropy effect) are exact in transversely isotropic (TI) formations for electromagnetic induction type measurements, as the one implemented in the wireline RTSCANNER instrument, and are approximate for electromagnetic propagation measurements, such as implemented in the PERISCOPE LWD instrument. Example layouts for electromagnetic induction and propagation type measurements are described in certain U.S. patents [see references 4, and 5].

The raw PERISCOPE instrument directional measurements (voltages) may be continuously acquired while the instrument is rotating, e.g., to advance or drill a wellbore through subsurface formations. The fitting algorithm [see references 1 and 2] outputs Fourier coefficients for each frequency, f, transmitter, t, and receiver r:

$$V(f, t, r) = a_0 + \sum_{k=1}^{2} \{a_k \cos(k\phi) + b_k \sin(k\phi)\} \quad (1)$$

where $a_k$ and $b_k$ are complex quantities, the subscript k denotes the number of the harmonic of the base frequency f, and $\phi$ defines the bedding (formation layer boundary or anisotropy) azimuth. Consider only the z-transverse (where z is oriented along the tool axis) coupling for the $1^{st}$ harmonic measurement:

$$V_{z\text{-}transverse} = a_1 \cos \phi + b_1 \sin \phi \quad (2)$$

The original boundary orientation angle with respect to the tool axis is determined by weighted averaging of angles for the real and imaginary part of the detected voltages, to minimize the noise effect assuming that angles from the real and imaginary part of voltage are the same [see reference 1]:

$$\phi = \frac{\sqrt{\text{Re}\{b_1\}^2 + \text{Re}\{a_1\}^2} \tan^{-1} \frac{\text{Re}\{b_1\}}{\text{Re}\{a_1\}} + \sqrt{\text{Im}\{b_1\}^2 + \text{Im}\{a_1\}^2} \tan^{-1} \frac{\text{Im}\{b_1\}}{\text{Im}\{a_1\}}}{\sqrt{\text{Re}\{b_1\}^2 + \text{Re}\{a_1\}^2} + \sqrt{\text{Im}\{b_1\}^2 + \text{Im}\{a_1\}^2}} \quad (3)$$

One of the drawbacks associated with the foregoing technique is that the response of boundary orientation angles sometimes appear erratic, typically occurring when individual angles from the real and imaginary components have opposite signs. An alternative boundary orientation angle definition, derived using the orthogonality condition of $a_1$ and $b_1$ components in the bedding coordinate system as defined for Deep Directional Resistivity (DDR) measurements [see reference 3], is given by:

$$\phi = \frac{1}{2}\tan^{-1}\frac{a_1 b_1^* + b_1 a_1^*}{a_1 a_1^* - b_1 b_1^*} \quad (4)$$

In terms of voltages, the angle is:

$$\phi = \frac{1}{2}\tan^{-1}\frac{V_{zx}V_{zy}^* + V_{zy}V_{zx}^*}{|V_{zx}|^2 - |V_{zy}|^2} \quad (5)$$

The boundary orientation may then be used to compose symmetrized and anti-symmetrized measurements [see references 1, 2 and 3]. The symmetrized measurements exactly remove the anisotropy and dip effect for electromagnetic induction measurements and approximately remove these effects for LWD electromagnetic propagation measurements in transversely isotropic formations. The antisymmetrized measurements minimize the boundary effect and enhance the anisotropy and dip effect.

To characterize the orientation (azimuth) of crossed fractures, aligned with the borehole, there are two approaches available for tri-axial induction logging measurements using crossed dipole XY and transverse couplings XX and YY [see reference 6] and LWD directional electromagnetic propagation with rotating LWD tools using a ratio of transverse antennas [see reference 7] and the second harmonic ratio XX/YY [see reference 8]. These are so-called second harmonic measurements. The same angles are also indicators of boundary orientation in TI layered formations.

SUMMARY

A method for determining orientation of an electrical resistivity boundary in a wellbore includes accepting measurements of an electromagnetic property of formations traversed by the wellbore as input to a computer. The measurements include an electromagnetic property of formations transversed by the wellbore (i) at at least one axial spacing between a multiaxial electromagnetic transmitter and a multiaxial electromagnetic receiver or (ii) at at least two axial spacings using a single axis transmitter and multiaxial receivers or a multiaxial transmitter and single axis receivers. The method further includes determining a symmetrized angle using measurements of the electromagnetic property made using cross coupled component measurements and determining at least a relative orientation of the electrical boundary with respect to an orientation of the well logging instrument using the symmetrized angle. The relative orientation is displayed or stored.

A method for well logging includes moving a multiaxial electromagnetic well logging instrument along a wellbore. An electromagnetic property of formations traversed by the wellbore is measured (i) at at least one axial spacing between a multiaxial electromagnetic transmitter and a multiaxial electromagnetic receiver or (ii) at at least two axial spacings using a single axis transmitter and multiaxial receivers or a multiaxial transmitter and single axis receivers on the well logging instrument. A symmetrized angle using cross-coupled measurements of the electromagnetic property is determined and at least a relative orientation of an electrical boundary in the formations with respect to an orientation of the well logging instrument using the symmetrized angle is determined.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIGS. 7A through 7F show 96" anti-symmetrized measurements response as a function of α and β to the boundary distance at 3 ft. where α and β are relative dip and azimuth (moderately far from boundary): $R_h$=2 Ωm, $R_v$=10 Ωm, $R_{shoulder}$=1 Ωm.

FIGS. 9A through 9F show 96 inch transmitter to receiver spacing symmetrized directional measurement as a function of boundary distance for different values of invasion radius and relative azimuth (solid lines=no invasion, dotted lines=an invasion radius of 10", dash lines=an invasion radius of 20", and dash-dotted lines=an invasion radius of 30"): $R_h$=2 Ωm, $R_v$=10 Ωm, α=20°, $R_{shoulder}$=1 Ωm.

DETAILED DESCRIPTION

Figure 1A:
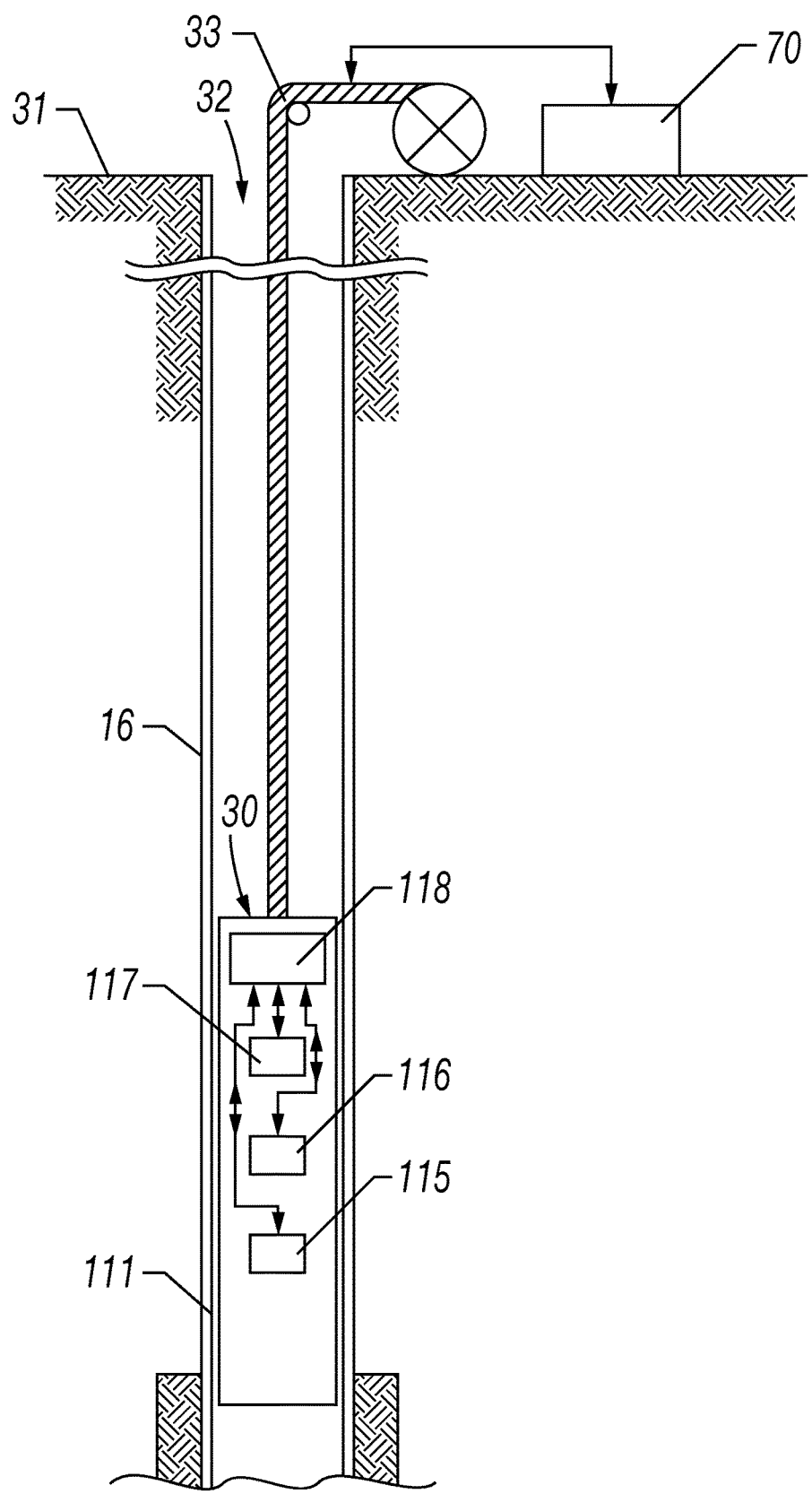
FIG. 1A shows an example wireline conveyed multi-axial electromagnetic well logging instrument disposed in a wellbore drilled through subsurface formations.

FIG. 1A shows an example multi-axial electromagnetic well logging instrument 30. The measurement components of the instrument 30 may be disposed in a housing 111 shaped and sealed to be moved along the interior of a wellbore 32. The well logging instrument 30 may, in a form hereof, be of a type sold under the trademark RT SCANNER, as described above.

The instrument housing 111 may contain at least one multi-axial electromagnetic transmitter 115, and two or more multi-axial electromagnetic receivers 116, 117 each disposed at different axial spacings from the transmitter 115. The transmitter 115, when activated, may emit a continuous wave electromagnetic field at one or more selected frequencies. Shielding (not shown) may be applied over the transmitter 115 and the receivers 116, 117 to protect the antenna coils which are deployed near the outer layer of the tool. The detectors 116, 117 may be multi-axis wire coils each coupled to a respective receiver circuit (not shown separately). Thus, detected electromagnetic energy may also be characterized at each of a plurality of distances from the transmitter 115.

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the receivers 116, 117 may be processed by suitable circuitry 118 for transmission along the cable 33 to the recording system 70. The recording system 70 may include a computer as will be explained below for analysis of the detected signals as well as devices for recording the signals communicated along the cable 33 from the instrument 30 with respect to depth and/or time.

A well logging tool similar to the one described above can also be used, for example, in logging-while-drilling ("LWD") equipment. A non-limiting example of a logging while drilling multiaxial logging instrument is sold under the trademark PERISCOPE as described above. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214 near the drill bit 216. The BHA 236 may include subassemblies for making measurements, processing and storing information and for communicating with the Earth's surface. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions.

Figure 1B:
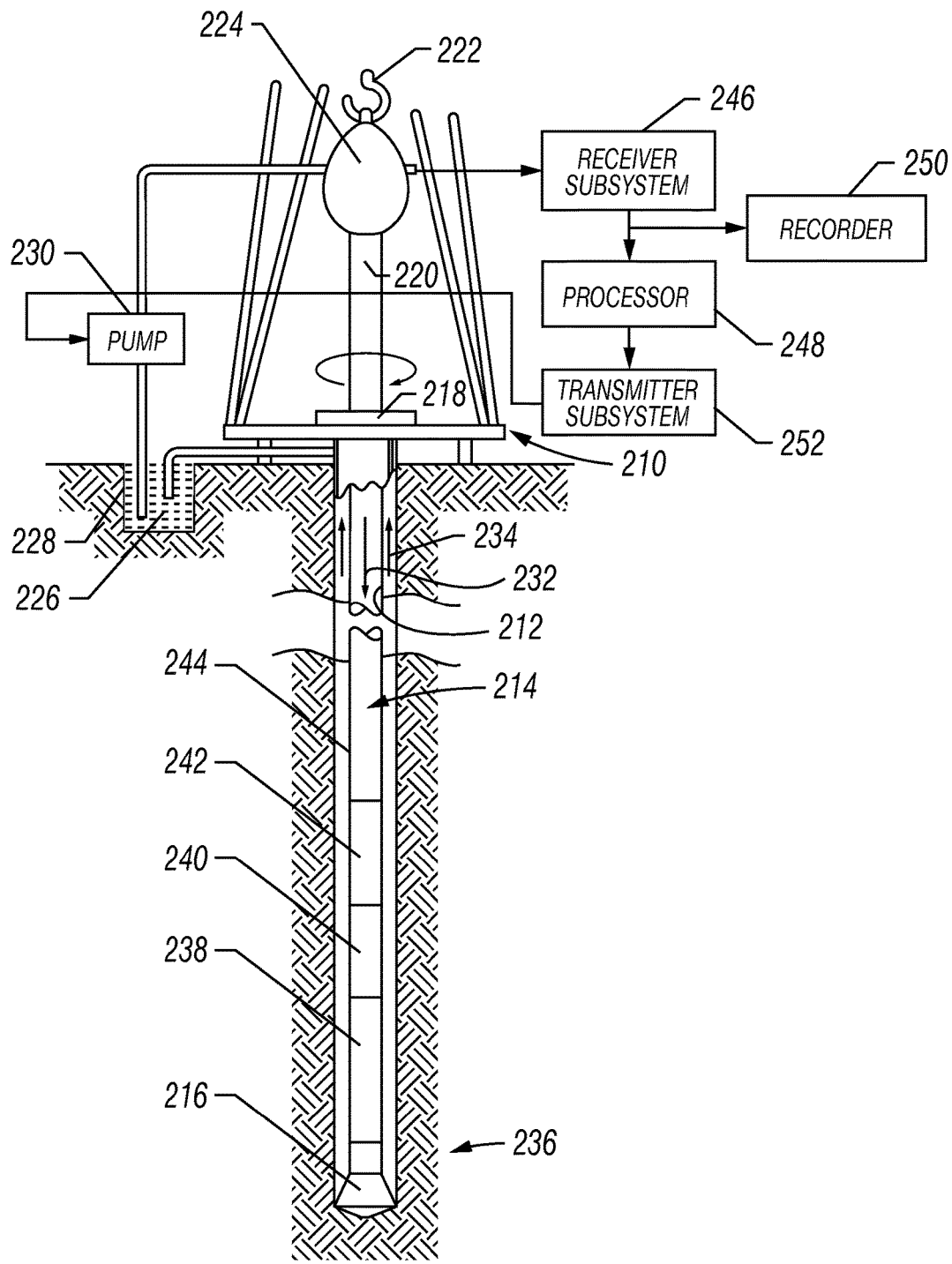
FIG. 1B shows an example well logging instrument system that may be used during wellbore drilling.

In the arrangement shown in FIG. 1B, the components of multi-axial induction well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored downhole and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

While the description that follows is based on measurements made from a tool such as the RTSCANNER instrument described with reference to FIG. 1A in which each of the transmitter and receivers comprises mutually orthogonal induction coils with one coil being aligned with the instrument's longitudinal axis, it is to be understood that for purposes of defining the scope of the disclosure, any induction well logging instrument with multi-axial transmitter(s) and receiver(s) having magnetic dipole axes along other directions and in other than three magnetic dipole axis elements (e.g., coils) per transmitter or receiver may be used provided that for each such transmitter and receiver it is possible to resolve three mutually orthogonal components of the transmitted electromagnetic field and the received electromagnetic field and where such resolved components are susceptible to either or both mechanical (physically embodied) or mathematical rotation to any selected coordinate system, e.g., Cartesian or cylindrical.

For purposes of the present disclosure, certain definitions of types of measurements made by the various well logging instruments are provided here. A "directly coupled" measurement is a measurement made wherein a dipole moment direction of an electromagnetic transmitter is the same as the dipole moment direction of a receiver used to measure a voltage induced therein. Thus, in the 9 component tensor measurement made at each multiaxial receiver in the previously described RTSCANNER instrument, the directly coupled measurements may be the XX, YY and ZZ component measurements, where the first letter in each letter pair represents the transmitter dipole moment axis direction and the second letter represents the receiver dipole moment direction. The XY, XZ, YX, YZ, ZX and ZY tensor component measurements may be referred to herein as cross-coupled measurements. It will also be appreciated by those skilled in the art that by the principle of reciprocity, reference herein to "transmitters" and "receivers" are fully equivalent to converse configurations wherein the described transmitter(s) and receiver(s) are entirely substituted by receiver(s) and transmitter(s), respectively.

Figure 2:
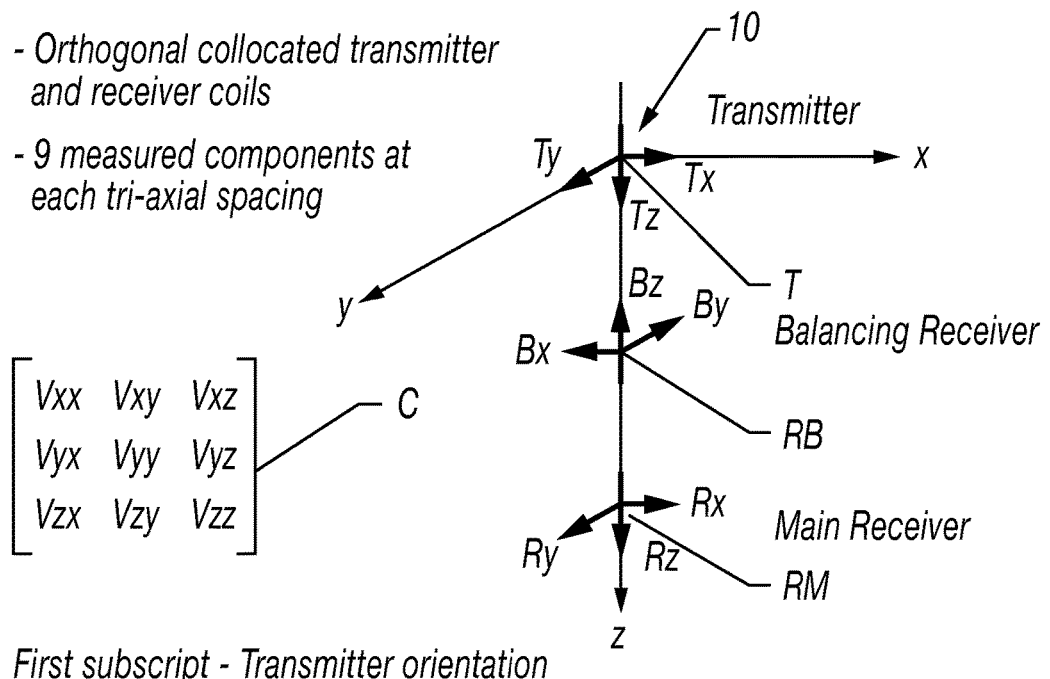
FIG. 2 shows an illustration of a multi-axial (e.g., triaxial) induction array measurement devices (transmitter and receivers) at a given spacing between the transmitter and each receiver.
Figure 3:
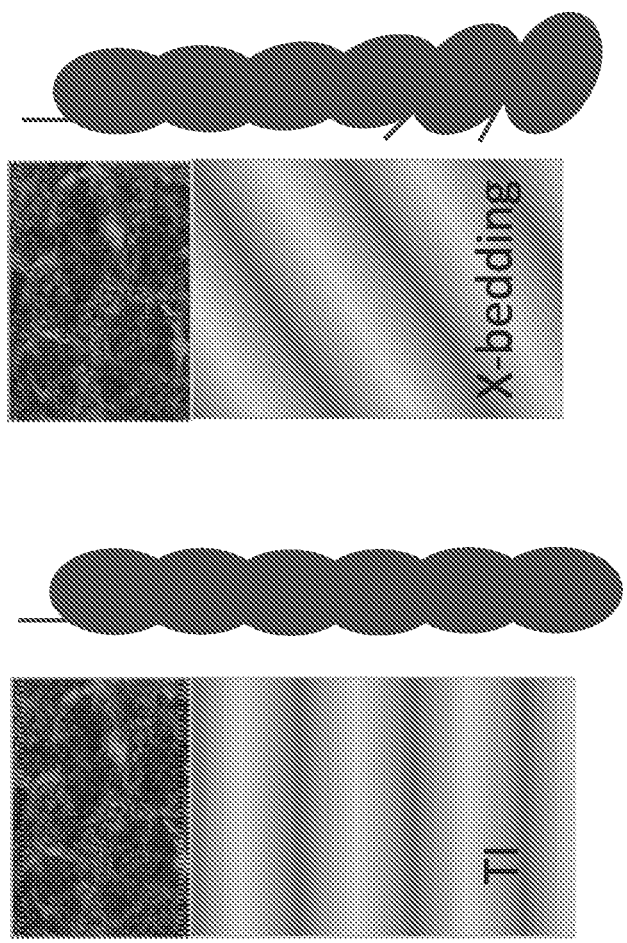
FIGS. 3A and 3B show boundary orientation obtained from cross-dipole couplings in transversely isotropic formation (FIG. 3A) and for formation with cross-bedding and general anisotropy with orientation different from boundary orientation (FIG. 3B).

Tensor induction measurements such as those explained above with reference to FIGS. 1A, 1B and 2 for well placement and reservoir characterization application have first harmonic cross-dipole couplings with cos θ azimuthal, sometimes referred to as "up-down" sensitivity, where up and down directions are in the reference frame of the layering of the subsurface formations. In LWD the measurement processing assumes a 1D transversely isotropic formation. In such cases, the boundary orientation [see references 1 and 2] obtained from individual couplings is consistent for all spacings and frequencies, and corresponds to the tool azimuth where the cross-dipole coupling (XZ or ZX) is maximal for a rotating (LWD) tool (FIG. 1B). It can be obtained from the ratio of two orthogonal cross-dipole couplings XZ and YZ (and ZX and ZY) for the wireline case (FIG. 1A), and similarly can be obtained from the LWD measurements' harmonic coefficients corresponding to the same couplings. In the case of titled anisotropy, cross-bedding of fractured reservoirs or any other asymmetry in the formation that can induce a cross-dipole signal, the corresponding angle represents the equivalent "boundary" or heterogeneity orientation and is not consistent among different couplings, and is dependent on both the transmitter frequency and the transmitter-receiver spacings [see reference 10]. With reference to linearly and elliptically polarized waves for TI or cross-bedding (titled transversely isotropic—TTI) case, as illustrated in FIGS. 3A and 3B, when the well logging instrument is far from a resistivity boundary the anisotropy orientation determines the directional angles, and as the instrument approaches a boundary the two effects couple.

It will be readily appreciated by those skilled in the art that the angles determined by the symmetrized and anti-symmetrized voltage signals described herein are referenced to the dipole moment directions of the transmitter(s) and receivers on the well logging instrument. To convert the determined angles from the reference frame of the instrument, one may make measurements of geomagnetic or geodetic direction of the instrument using any well-known directional sensor system known in the art. One type of such system includes three, mutually orthogonal magnetometers and three mutually orthogonal accelerometers to determine the geomagnetic orientation of the well logging instrument. The geomagnetic orientation of the instrument may be used to rotate the instrument frame of reference to the geomagnetic frame of reference, thus enabling determination of the geomagnetic orientation of anisotropy and/or bed boundary. If the geomagnetic dip and declination at the well location are known, the geomagnetic reference frame may be converted to the geodetic reference frame. In other examples, gyroscopes may be substituted for the magnetometers, and the geodetic orientation of the well logging instrument may be determined directly. As will also be appreciate by those skilled in the art, the rotary orientation of the LWD instrument (e.g., the PERISCOPE instrument) may be determined during rotation of the instrument by rapid sampling (e.g., at about 2 kHz) of the magnetometers to determine rotational orientation, with only periodic cessation of rotation (e.g., at directional survey positions during drilling) to enable full geomagnetic orientation using measurements of Earth's gravitational field using the accelerometer measurements.

Stokes Parameters

The concept of boundary orientation angle can be also elucidated from the view of the Stokes parameters [see reference 12]. It can be shown that the $|V_{z\text{-}transverse}|^2$ traces out a tilted ellipse as a tool rotation angle. The angle at which the major axis of the ellipse orients corresponds to formation bedding or anisotropy azimuth according to the expression:

$$\phi = \frac{1}{2}\tan^{-1}\frac{U}{Q} = \frac{1}{2}\tan^{-1}\frac{2(\text{Im}(a_1)\text{Im}(b_1) + \text{Re}(a_1)\text{Re}(b_1))}{a_1 a_1^* - b_1 b_1^*} \quad (6)$$

where Q and U are the second and third Stokes parameters. This angle is called the polarization angle. An alternative angle definition from equations (4) and (5) gives rise to the identical expression as the angle definition derived using the Stokes parameters.

Figure 4:
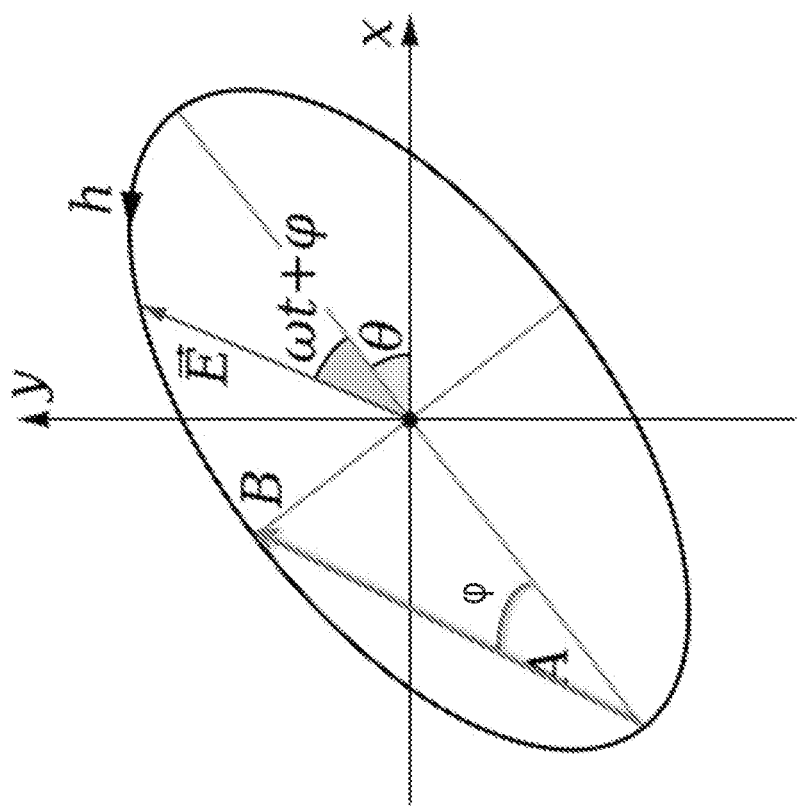
FIG. 4 shows Stokes parameters. Ellipse polarization φ correspond to boundary or anisotropy orientation, while ellipticity ϕ correspond to formation heterogeneity and degree of linear polarization (a 3D indicator).

The definition above may also be formulated by using the Stokes parameters and polarization for an ellipse arising from Vzx and Vzy voltages. The Stokes parameters [see reference 12], illustrated in FIG. 4, may be obtained as follows:

$$I = |V_{zx}|^2 + |V_{zy}|^2 = V_{zx}V_{zx}^* + V_{zy}V_{zy}^* = Re\{V_{zx}\}^2 + Im\{V_{zx}\}^2 + Re\{V_{zy}\}^2 + Im\{V_{zy}\}^2 \quad (7)$$

$$Q = |V_{zx}|^2 - |V_{zy}|^2 = V_{zx}V_{zx}^* - V_{zy}V_{zy}^* = Re\{V_{zx}\}^2 + Im\{V_{zx}\}^2 - Re\{V_{zy}\}^2 - Im\{V_{zy}\}^2 \quad (8)$$

$$U = 2\operatorname{Re}(V_{zx}V_{zy}^*) = V_{zx}V_{zy}^* + V_{zy}V_{zx}^* = 2(\operatorname{Im}\{V_{zx}\}\operatorname{Im}\{V_{zy}\} + \operatorname{Re}\{V_{zx}\}\operatorname{Re}\{V_{zy}\}) \quad (9)$$

$$V = 2\operatorname{Im}(V_{zx}V_{zy}^*) = i(V_{zy}V_{zx}^* - V_{zx}V_{zy}^*) = 2(\operatorname{Im}\{V_{zx}\}\operatorname{Re}\{V_{zy}\} - \operatorname{Re}\{V_{zx}\}\operatorname{Im}\{V_{zy}\}) \quad (10)$$

where, I is the total intensity, |V| is the intensity of the circular polarization, |L| is the intensity of linear polarization and $L = |L|e^{j2\Theta} = Q + iU$. The orientation angle of the ellipse, corresponds to the boundary orientation and may be given by the expression:

$$\phi = \frac{1}{2}\tan^{-1}\left(\frac{U}{Q}\right) \quad (11)$$

or $$\phi = \frac{1}{2}\tan^{-1}\frac{2(\operatorname{Im}\{V_{zx}\}\operatorname{Im}\{V_{zy}\} + \operatorname{Re}\{V_{zx}\}\operatorname{Re}\{V_{zy}\})}{\operatorname{Re}\{V_{zx}\}^2 + \operatorname{Im}\{V_{zx}\}^2 - \operatorname{Re}\{V_{zy}\}^2 - \operatorname{Im}\{V_{zy}\}^2} \quad (12)$$

The boundary orientation concept assumes a transversely isotropic (TI) layered medium (formation), ignoring the complexities of real subsurface formations. In these conditions, the electromagnetic field will be linearly polarized, i.e., all measurements (different spacing and frequency) should produce the same apparent boundary orientation. In reality, borehole eccentering, cross-bedding, asymmetric invasion (fluid infiltration into the formations from the wellbore), non-parallel boundaries, and/or dipping faults can cause inconsistent angles and different interpretation of the boundary (or rather, heterogeneity) orientation. This results in the elliptical polarization of the electromagnetic field. The underlying challenge in interpreting the resulting bedding or boundary angle lies in the influence of ellipticity from the voltage ellipse which is captured by the third Stokes parameter, V that measures the circular polarization tendency. The ellipticity angle φ is given by the expression:

$$\varphi = \frac{1}{2}\tan^{-1}\frac{V}{\sqrt{Q^2 + U^2}} \quad (13)$$

φ varies from −45° to 45° and is a measure of the degree of linear polarization. φ may also indicate the presence of non 1D effects. When φ=0°, the voltage ellipse collapses into a straight line and the complex voltages are completely linearly polarized. When φ=+/−45°, the complex voltages are circularly polarized. In the absence of boundary effect, the effect of cross-bedded anisotropy leads to a simple rotation of linearly polarized received voltages so its corresponding ellipticity angle is zero regardless of the effect of cross-bedded anisotropy. However, in presence of a nearby formation or resistivity boundary, the polarization of the received voltages tends to be elliptical. As a result, the degree of correlation between the computed boundary orientation angle and the actual orientation of the boundary becomes lower.

Symmetrized and Antisymmetrized Angles

Methods according to the present disclosure are related to the development of two distinct angles, symmetrized and anti-symmetrized angles, for characterizing boundary and anisotropy orientations and recomposing directional measurements with the proposed angles. The expressions of symmetrized and anti-symmetrized angles are derived by first taking the difference and sum of z-transverse couplings for general 3D scenarios and then evaluating their polarization angles. The expression of the difference of z-transverse couplings, $V_{up} - V_{down}$, is given by $V_{zt1} - V_{t1z}$.

$$V_{zt1} - V_{t1z} = (V_{zx}\cos\phi + V_{zy}\sin\phi) - (V_{xz}\cos\phi + V_{yz}\sin\phi) \quad (14)$$

or $$V_{zt1} - V_{t1z} = (V_{zx} - V_{xz})\cos\phi + (V_{zy} - V_{yz})\sin\phi \quad (15)$$

The symmetrized angle corresponds to the boundary orientation that can be obtained from symmetrized voltages, from the real and imaginary part:

$$\phi_{SDre} = \tan^{-1}\frac{\operatorname{Re}\{V_{zy} - V_{yz}\}}{\operatorname{Re}\{V_{zx} - V_{xz}\}} \quad (16)$$

$$\phi_{SDim} = \tan^{-1}\frac{\operatorname{Im}\{V_{zy} - V_{yz}\}}{\operatorname{Im}\{V_{zx} - V_{xz}\}} \quad (17)$$

In another example, the symmetrized angle can be defined as a weighted average of the two angles:

$$\phi_{SD} = \frac{1}{\sqrt{\operatorname{Re}\{V_{zx} - V_{xz}\}^2 + \operatorname{Re}\{V_{zy} - V_{yz}\}^2} + \sqrt{\operatorname{Im}\{V_{zx} - V_{xz}\}^2 + \operatorname{Im}\{V_{zy} - V_{yz}\}^2}} \left( \sqrt{\operatorname{Re}\{V_{zy} - V_{yz}\}^2 + \operatorname{Re}\{V_{zx} - V_{xz}\}^2}\, \tan^{-1}\frac{\operatorname{Re}\{V_{zy} - V_{yz}\}}{\operatorname{Re}\{V_{zx} - V_{xz}\}} + \sqrt{\operatorname{Im}\{V_{zy} - V_{yz}\}^2 + \operatorname{Im}\{V_{zx} - V_{xz}\}^2}\, \tan^{-1}\frac{\operatorname{Im}\{V_{zy} - V_{yx}\}}{\operatorname{Im}\{V_{zx} - V_{xz}\}} \right) \quad (18)$$

Using the previous definition of polarization angle, it follows that the expression for boundary angle for symmetrized directional measurement is given by the expression:

$$\phi_{SD} = \frac{1}{2}\tan^{-1}\left(\frac{2(\operatorname{Im}\{V_{zx} - V_{xz}\}\operatorname{Im}\{V_{zy} - V_{yz}\} + \operatorname{Re}\{V_{zx} - V_{xz}\}\operatorname{Re}\{V_{zy} - V_{yz}\})}{|V_{zx} - V_{xz}|^2 - |V_{zy} - V_{yz}|^2}\right) = \frac{1}{2}\tan^{-1}\left(\frac{2(\operatorname{Im}\{V_{zx} - V_{xz}\}\operatorname{Im}\{V_{zy} - V_{yz}\} + \operatorname{Re}\{V_{zx} - V_{xz}\}\operatorname{Re}\{V_{zy} - V_{yz}\})}{\operatorname{Re}\{V_{zx} - V_{xz}\}^2 + \operatorname{Im}\{V_{zx} - V_{xz}\}^2 - \operatorname{Re}\{V_{zy} - V_{yz}\}^2 - \operatorname{Im}\{V_{zy} - V_{yz}\}^2}\right) \quad (19)$$

This angle definition is known as the symmetrized angle. By the same token, the expression of the difference of z-transverse couplings, $V_{up} + V_{down}$, is given by $V_{zt1} + V_{t1z}$.

$$V_{zt1} + V_{t1z} = (V_{zx}\cos\phi + V_{zy}\sin\phi) + (V_{xz}\cos\phi + V_{yz}\sin\phi) \quad (20)$$

or $$V_{zt1} + V_{t1z} = (V_{zx} + V_{xz})\cos\phi + (V_{zy} + V_{yz})\sin\phi \quad (21)$$

The anti-symmetrized angle corresponds to the anisotropy orientation that can be obtained from the anti-symmetrized voltages, from real and imaginary part:

$$\phi_{ASre} = \tan^{-1}\frac{\operatorname{Re}\{V_{zy} + V_{yz}\}}{\operatorname{Re}\{V_{zx} + V_{xz}\}} \quad (22)$$

-continued $$\phi_{ASim} = \tan^{-1}\frac{\text{Im}\{V_{zy} + V_{yz}\}}{\text{Im}\{V_{zx} + V_{xz}\}} \quad (23)$$

In another example, the anti-symmetrized angle can be defined as a weighted average of two above angles:

$$\phi_{AS} = \frac{1}{\sqrt{\text{Re}\{V_{zx} + V_{xz}\}^2 + \text{Re}\{V_{zy} + V_{yz}\}^2} +} \quad (24)$$
$$\sqrt{\text{Im}\{V_{zx} + V_{xz}\}^2 + \text{Im}\{V_{zy} + V_{yz}\}^2}$$
$$\left(\sqrt{\text{Re}\{V_{zy} + V_{yz}\}^2 + \text{Re}\{V_{zx} + V_{xz}\}^2}\ \tan^{-1}\frac{\text{Re}\{V_{zy} + V_{yz}\}}{\text{Re}\{V_{zx} - V_{xz}\}} + \right.$$
$$\left.\sqrt{\text{Im}\{V_{zy} + V_{yz}\}^2 + \text{Im}\{V_{zx} + V_{xz}\}^2}\ \tan^{-1}\frac{\text{Im}\{V_{zy} + V_{yz}\}}{\text{Im}\{V_{zx} + V_{xz}\}}\right)$$

The expression for angle for the anti-symmetrized measurement corresponding to anisotropy orientation may be given by the expression:

$$\phi_{anti\text{-}sym} = \frac{1}{2}\tan^{-1}\left(\frac{2(\text{Im}\{V_{zx} + V_{xz}\}\text{Im}\{V_{zy} + V_{yz}\} +}{\text{Re}\{V_{zx} + V_{xz}\}\text{Re}\{V_{zy} + V_{yz}\})}{|V_{zx} + V_{xz}|^2 - |V_{zy} + V_{yz}|^2}\right) = \quad (25)$$

$$\frac{1}{2}\tan^{-1}\left(\frac{2(\text{Im}\{V_{zx} + V_{xz}\}\text{Im}\{V_{zy} + V_{yz}\} +}{\text{Re}\{V_{zx} + V_{xz}\}\text{Re}\{V_{zy} + V_{yz}\})}{\text{Re}\{V_{zx} + V_{xz}\}^2 + \text{Im}\{V_{zx} + V_{xz}\}^2 - \text{Re}\{V_{zy} + V_{yz}\}^2 - \text{Im}\{V_{zy} + V_{yz}\}^2}\right)$$

Generalized Directional Measurement Definitions

Once the symmetrized and anti-symmetrized angles are obtained, up and down voltages when tool is oriented up and down with respect to the bedding plane defined below may be calculated. For symmetrized measurements:

$$V_{up}^{SD} = V_{zz} + V_{zt1}^{SD} = V_{zz} + V_{zx}^{SD}\cos(\phi_{SD}) + V_{zy}^{SD}\sin(\phi_{SD}) \quad (26)$$

$$V_{dn}^{SD} = V_{zz} - V_{zt1}^{SD} = V_{zz} - V_{zx}^{SD}\cos(\phi_{SD}) - V_{zy}^{SD}\sin(\phi_{SD}) \quad (27)$$

For the anti-symmetrized measurements, $$V_{up}^{AS} = V_{zz} + V_{zt1}^{AS} = V_{zz} + V_{zx}^{AS}\cos(\phi_{AS}) + V_{zy}^{AS}\sin(\phi_{AS}) \quad (28)$$

$$V_{dn}^{AS} = V_{zz} - V_{zt1}^{AS} = V_{zz} - V_{zx}^{AS}\cos(\phi_{AS}) - V_{zy}^{AS}\sin(\phi_{AS}) \quad (29)$$

where the subscript zt denotes the z-to-transverse plane coupling component along the major axis of polarization ellipse in the x-y plane.

Subsequently, directional attenuation and phase shift may be computed and their values are given by the expressions:

$$Att = 20\log_{10}\left|\frac{V_{up}}{V_{dn}}\right| \quad (30)$$

$$PS = \frac{180}{\pi}\text{angle}\left(\frac{V_{up}}{V_{dn}}\right) \quad (31)$$

Symmetrization and anti-symmetrization may then be performed by differencing and summing attenuations and phase shifts from a symmetrized transmitter-receiver pair.

The relative boundary dip and azimuth with respect to the instrument may be computed from true formation dip and azimuth $\theta_F$ and $\phi_F$ and trajectory inclination and azimuth $\theta_T$ and $\phi_T$ using the expression:

$$\alpha = \cos^{-1}(\cos(\theta_T)\cos(\theta_F) - \cos(\phi_F - \phi_T)\sin(\theta_T)\sin(\theta_F))$$

$$\beta = \tan 2^{-1}(-\cos(\theta_T)\cos(\phi_F - \phi_T) - \cos(\theta_F)\sin(\theta_T), -\sin(\theta_F)\sin(\phi_F - \phi_T)) \quad (32)$$

As explained above, the relative orientation between the well logging instrument and a geomagnetic and/or geodetic direction may be readily determined using directional sensors known in the art.

Multistep Inversion Signal Processing

Practical inversion-based signal processing techniques may be based on different component measurement sensitivities to dip and azimuth of resistivity anisotropy to ensure that measurement noise does not propagate into parameters to which some component measurements are not sensitive. Separability of the formation layer boundary and resistivity anisotropy effects using the generalized processing described above may be used to devise a more robust inversion procedure, e.g., one that solves a low dimensionality problem in a sequence rather than a high dimensionality problem solving for all parameter at once. The latter procedure may be more likely to result in non-unique solutions and may have more ambiguity.

A multistep approach for well placement (i.e., positioning the wellbore within a selected subsurface formation) and for reservoir characterization according to the present disclosure may take advantage of the specific sensitivities of different groups of component measurements using a 1-dimensional formation model with cross-bedding (TTI tilted transverse anisotropy). An example procedure may include the following sequence of actions:

1. Use the symmetrized angle and symmetrized measurements in a known inversion procedure assuming a transversely isotropic formation to determine a distance of the well logging instrument to boundaries of formation layers. One non-limiting example of such an inversion procedure is described in Omeragic et al., U.S. Pat. No. 6,594,584.

2. Based on a distance to the formation boundaries determined from the above inversion procedure, next one may perform inversion for the resistivity anisotropy and its orientation using anti-symmetrized measurements, starting from the anti-symmetrized angle.

3. Use all the component measurements to invert for all the parameters using the model from the foregoing inversion to determine resistivity anisotropy and its orientation as an initial model for the inversion. The parameters for which the present inversion may be performed include, without limitation, horizontal and vertical conductivities ($\sigma h$, $\sigma v$) or their converse, resistivities, relative dip angle ($\theta$) and the dip azimuthal direction ($\Phi$), as well as wellbore/logging instrument properties, such as drilling fluid (mud) conductivity ($\sigma mud$), wellbore diameter (hd), instrument eccentering distance (decc) and tool eccentering azimuthal angle ($\psi$).

The foregoing data processing procedures may include input from other measurements, such as an azimuthal laterolog to provide high resolution resistivity or local formation dip.

Figure 5:
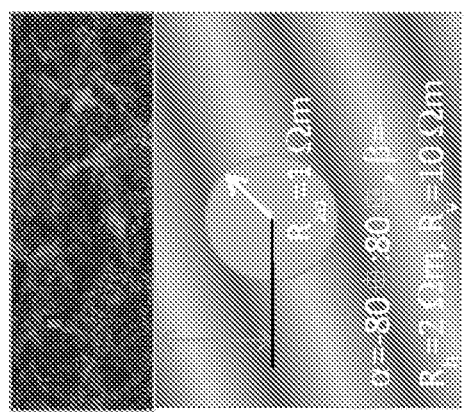
FIG. 5 shows an example geometry of formations and instrument position used to test methods according to the present disclosure.
Figure 6B:
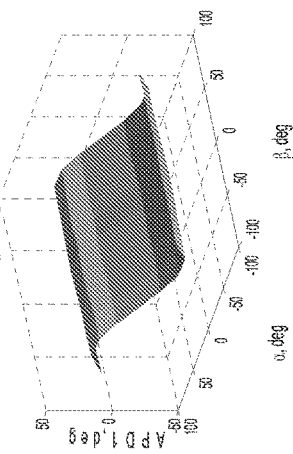
FIGS. 6A through 6F show 96" anti-symmetrized measurements response as a function of relative dip and azimuths, α and β, to the boundary distance at 10 ft. (very far from boundary): $R_h$=2 Ω/m, $R_v$=10 Ωm, $R_{shoulder}$=1 Ωm.
Figure 6D:
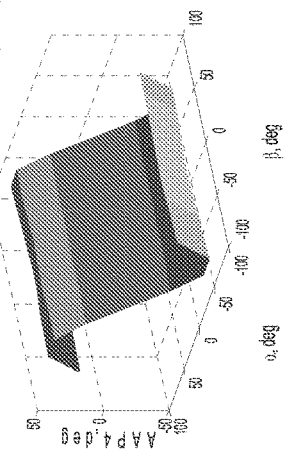
Figure 6F:
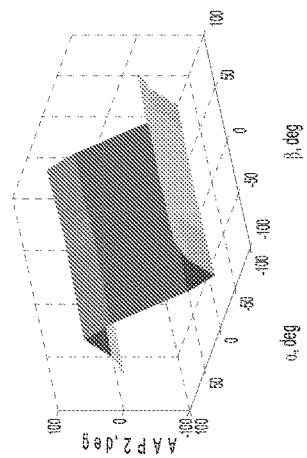
Figure 6A:
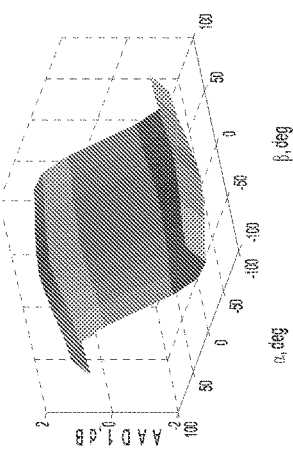
Figure 6C:
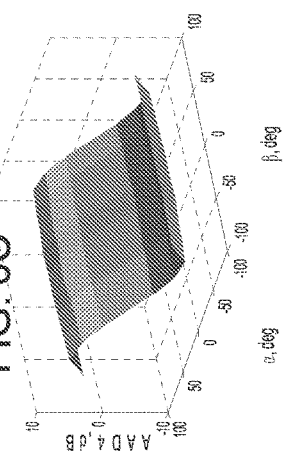
Figure 6E:
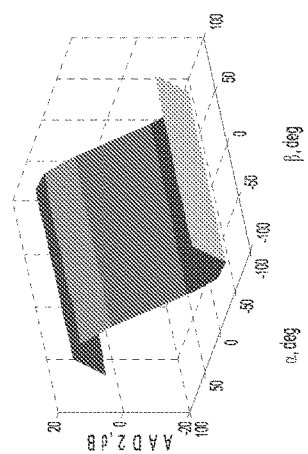
Figure 8A:
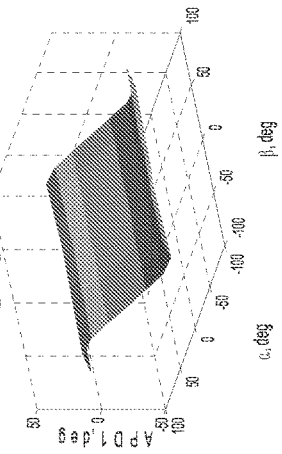
FIGS. 8A through 8F show 96" anti-symmetrized measurements response as a function of α and β to the boundary distance at 1 ft. (close to boundary): $R_h$=2 Ωm, $R_v$=10 Ωm, $R_{shoulder}$=1 Ωm.
Figure 8B:
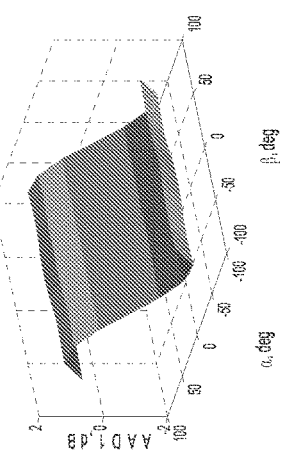
Figure 8C:
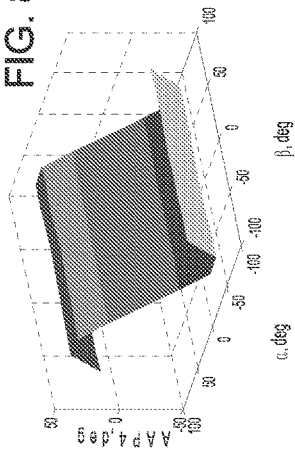
Figure 8D:
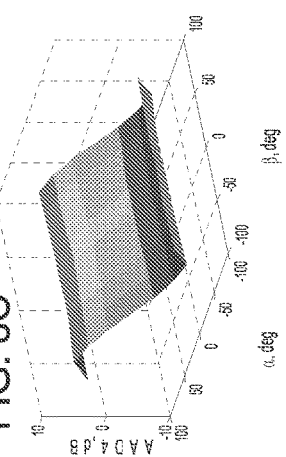
Figure 8E:
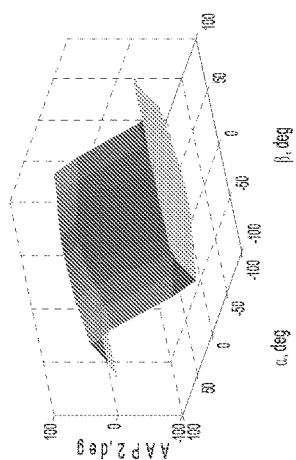
Figure 8F:
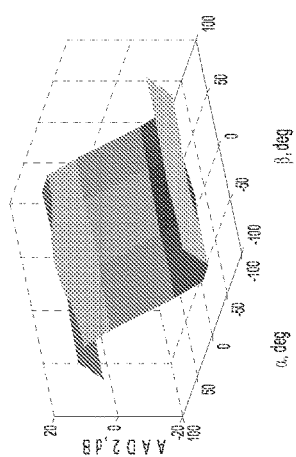
Figure 10A:
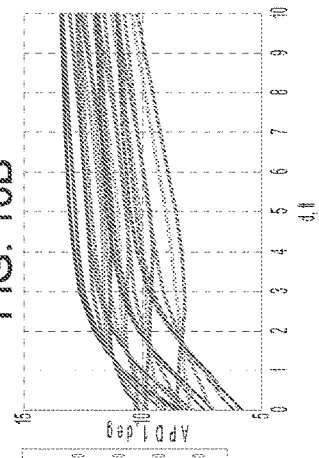
FIGS. 10A through 10F show 96" anti-symmetrized directional measurement as a function of boundary distance for different values of invasion radius and relative azimuth (solid lines=no invasion, dotted lines=an invasion radius of 10", dash lines=an invasion radius of 20", and dash-dotted lines=an invasion radius of 30"): $R_h$=2 Ωm, $R_v$=10 Ωm, α=20°, $R_{shoulder}$=1 Ωm.
Figure 10B:
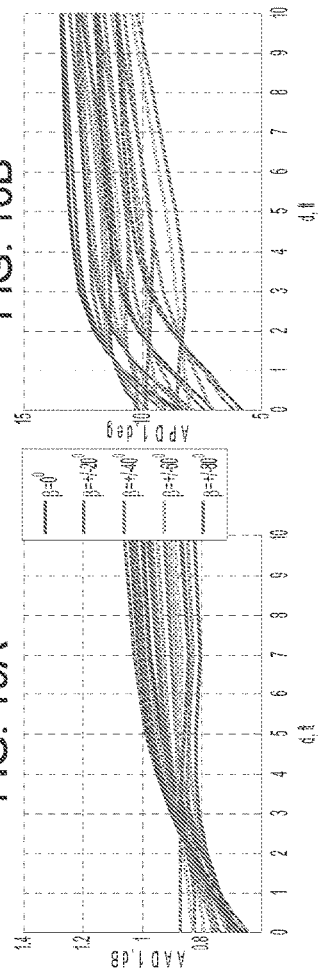
Figure 10C:
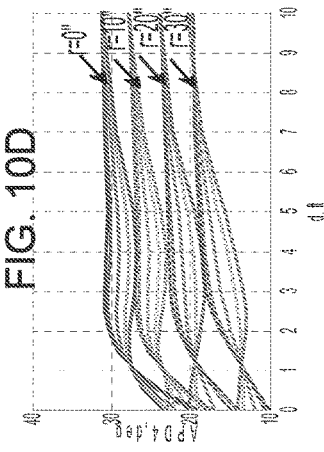
Figure 10D:
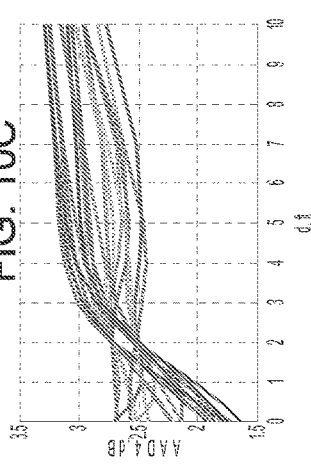
Figure 10E:
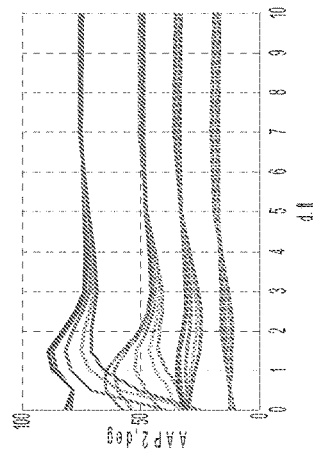
Figure 10F:
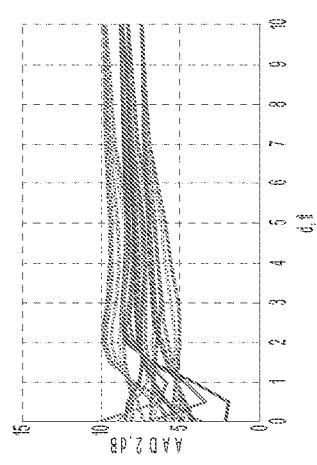

To examine a sufficient range of relative dip and azimuth, $\alpha$ and $\beta$ respectively, the simulations of instrument response were performed over intervals $-80°<\alpha<80°$ and $-80°<\beta<80°$. Cases were simulated wherein a formation boundary is 1 foot, 3 feet and 10 feet away from the instrument, as illustrated in FIG. 5. The anti-symmetrized measurements are presented as a function of relative dip and azimuth for the boundary distance of 10 feet in FIGS. 6A through 6F. The anti-symmetrized measurements show a $\sin(2\alpha)$ dependence, and do not depend on the relative azimuth.

In FIGS. 7A through 7F, the anti-symmetrized measurements are shown as a function of relative dip and azimuth for a boundary distance of 3 feet. The anti-symmetrized measurements appear to preserve a simple $\sin(2\alpha)$ dependence and have very weak dependence on the relative azimuth $\beta$.

In FIGS. 8A through 8F, the anti-symmetrized measurements are shown as a function of relative dip and azimuth for the instrument being close to the boundary, at distance of 1 foot. The anti-symmetrized measurements still show a $\sin(2\alpha)$ dependence. At 2 MHz, the responses may be slightly distorted for high azimuth. In general, however, the $\sin(2\alpha)$ dependence is preserved even in presence of strong boundary effect.

Next, the sensitivity results of the 96-inch T-R spacing symmetrized measurements as a function of boundary distance for different values of $\beta$ are shown in FIGS. 9A through 9F and 10A through 10F. The symmetrized directional responses appear to decrease exponentially as a function of the instrument distance to the boundary and have an even symmetry with respect to $\beta=0$. When far from the boundary, the effect of circular invasion is negligible due to the symmetry.

In FIGS. 9A through 9F, 100 kHz and 400 kHz symmetrized responses show very little sensitivity to anisotropy azimuth $\beta$. In addition, when close to boundary, the 2 MHz measurements show some dependency to $\beta$ especially for 10" invasion and no invasion cases. FIGS. 10A through 10F show the 96 inch T-R spacing anti-symmetrized measurements as a function of boundary distance for different values of $\beta$. Anti-symmetrized measurements strongly depend on invasion depth and show very little variation as a function of boundary distance.

Figure 11:
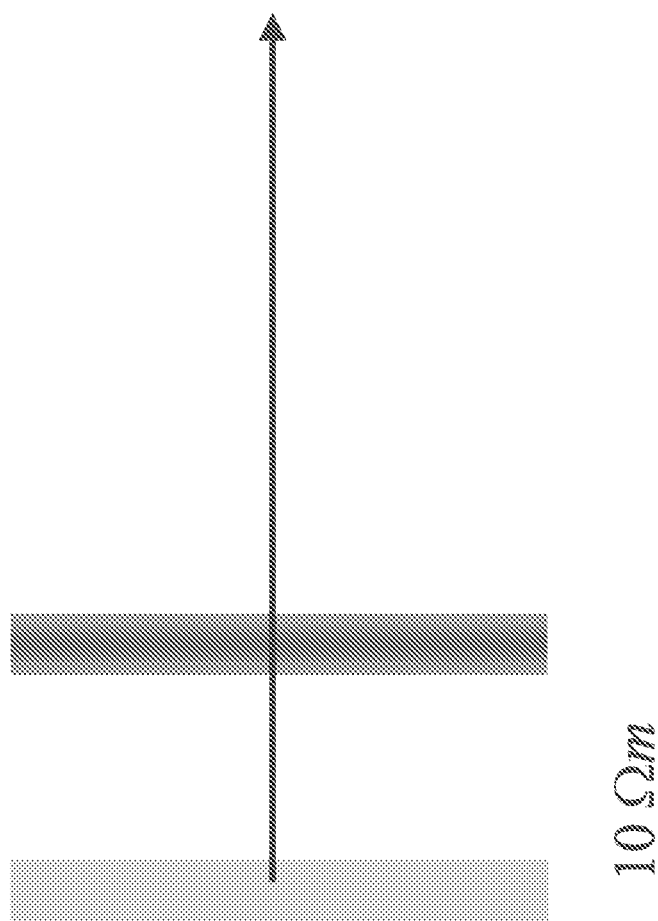
FIG. 11 shows modeling tool response as a function of fracture density and orientation.

To illustrate sensitivity to fracture density the PERISCOPE instrument responses for different fracture density were modeled, as shown in FIG. 11.

Figure 12B:
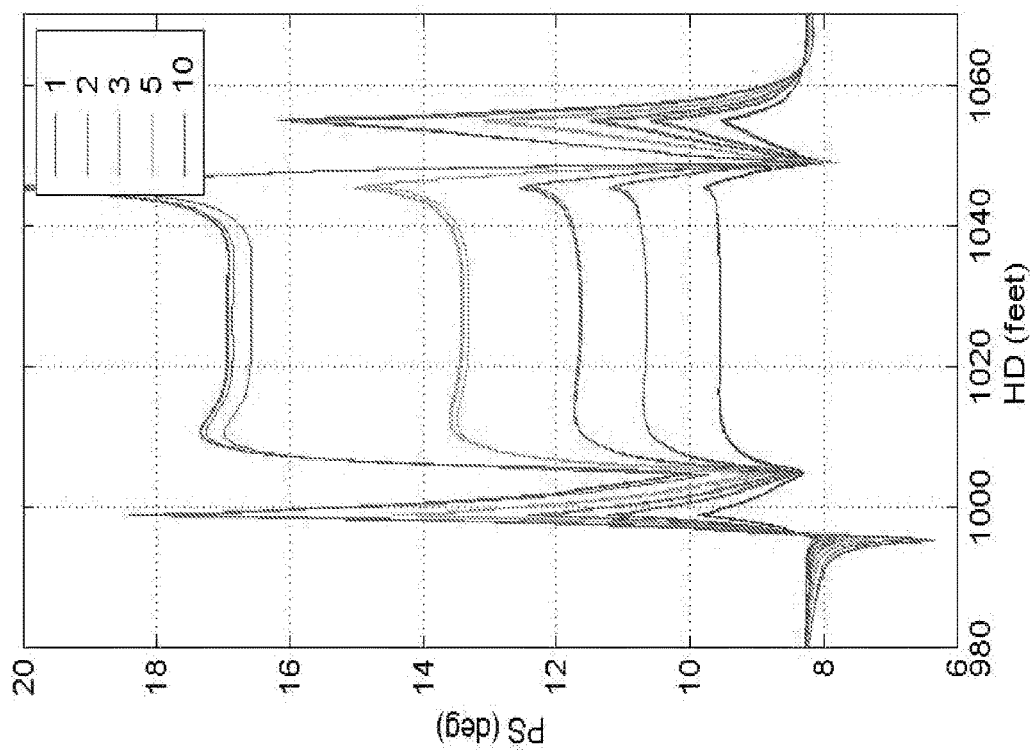
FIGS. 12A and 12B show PERISCOPE instrument anisotropy measurement response to fracture density.
Figure 12A:
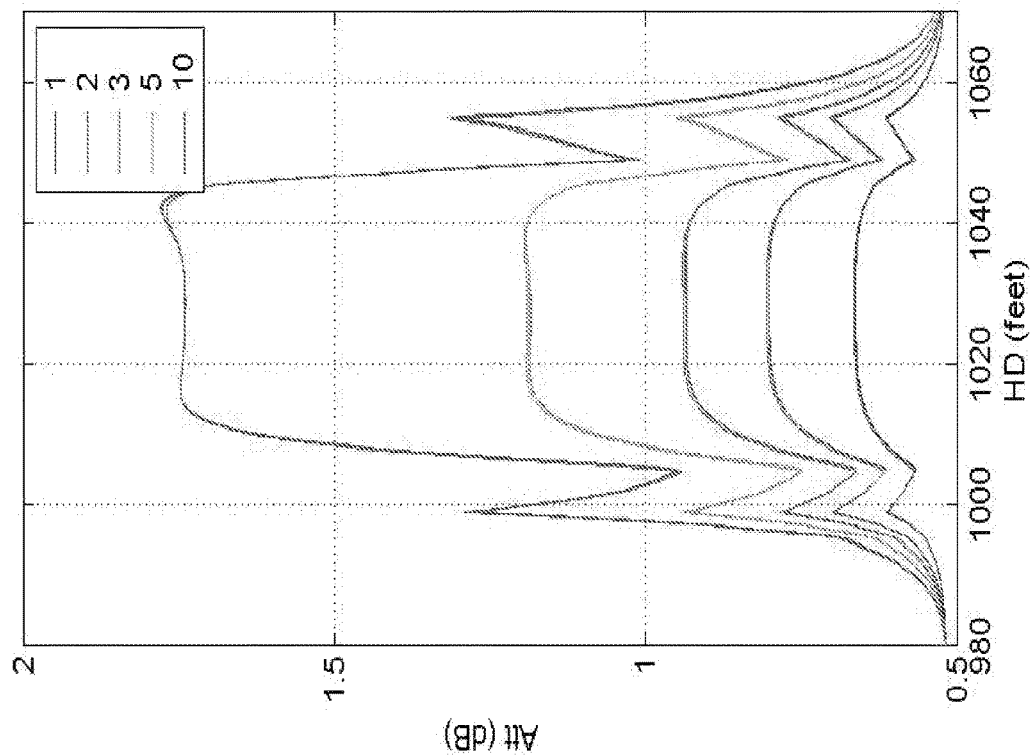

FIGS. 12A and 12B show the PERISCOPE instrument anisotropy measurement response to fracture density. If the fracture density is uniform the measurements are proportional to the fracture density.

Figure 13B:
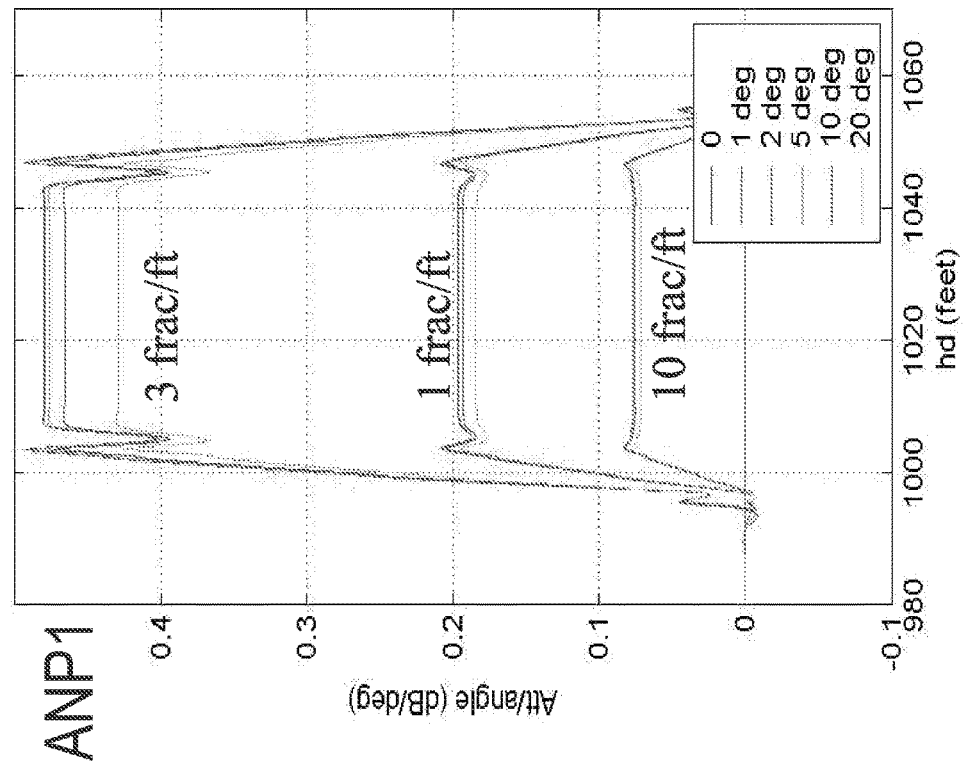
FIGS. 13A and 13B show PERISCOPE instrument anti-symmetrized measurement response to fracture density and orientation.
Figure 13A:
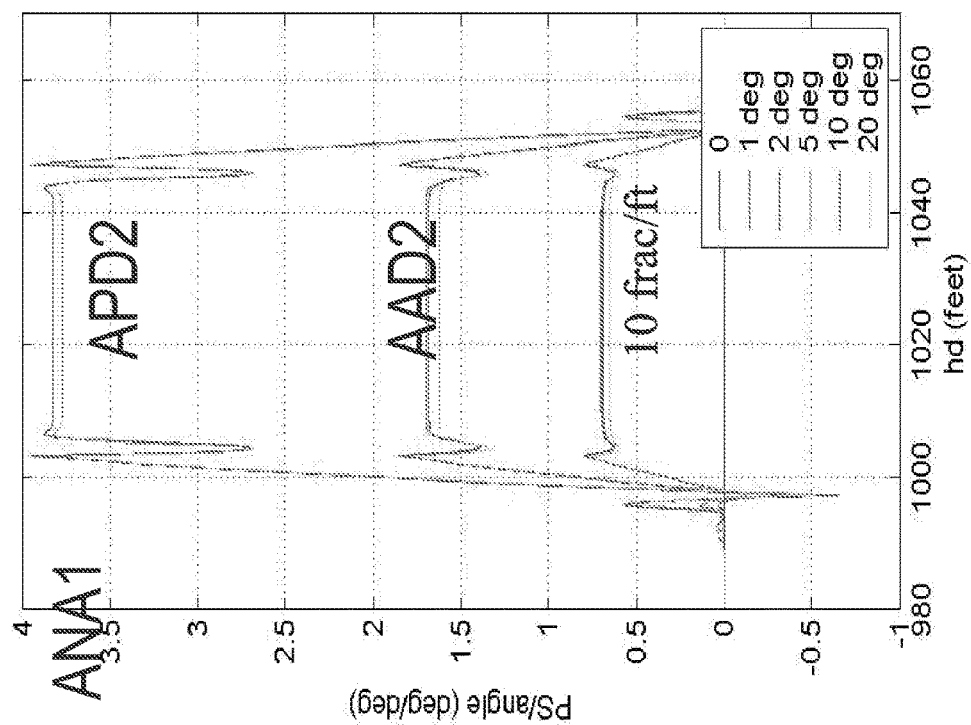

FIGS. 13A and 13B illustrates the PERISCOPE instrument anti-symmetrized measurement response to fracture density and orientation. If the fracture density is uniform the measurements are proportional to the fracture density. The response is scaled to anisotropy angle with respect to tool axis. The response scales nearly linearly for up to 20°.

Figures 14A, 14B:
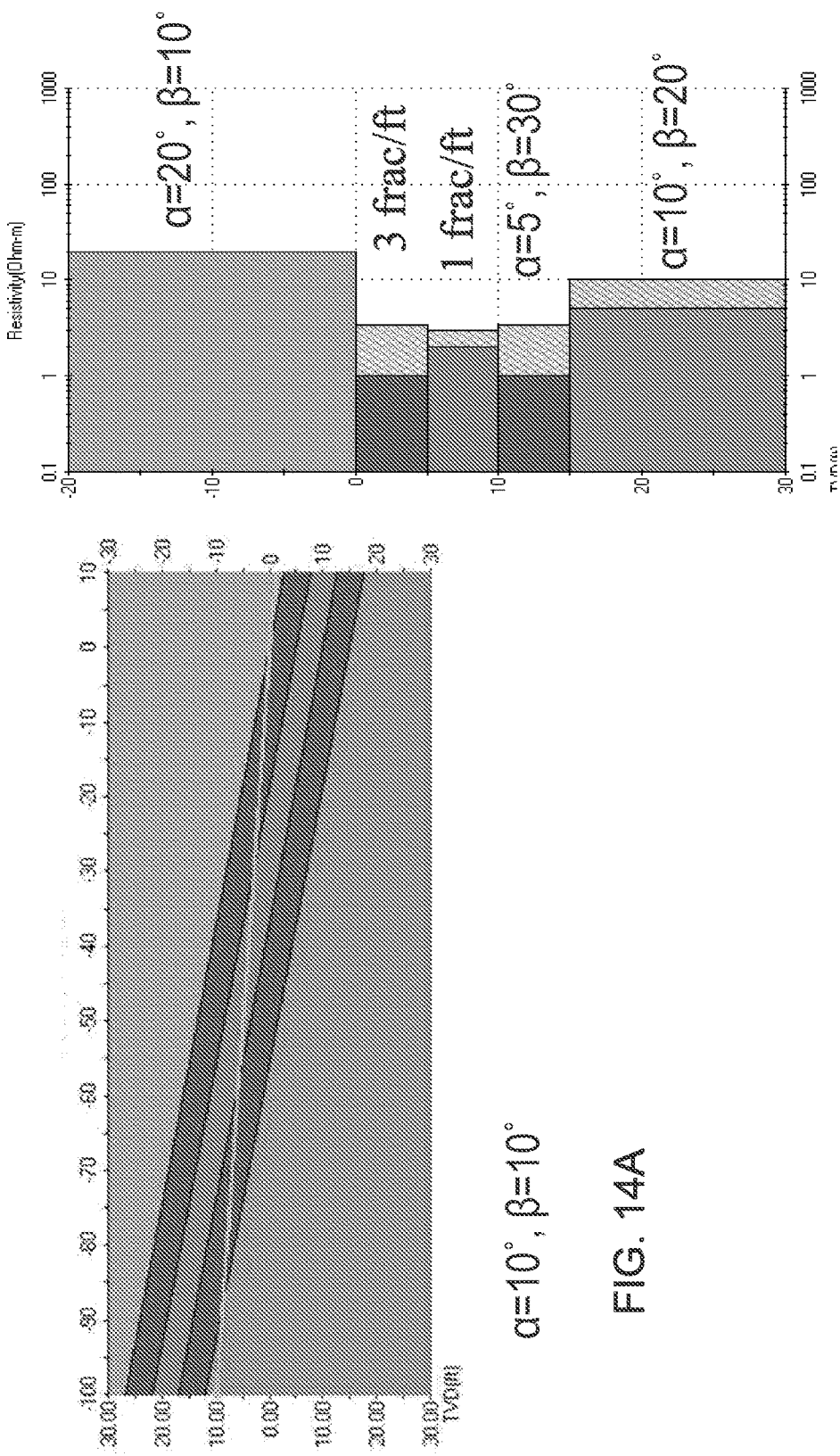
FIGS. 14A and 14B show test formation: horizontal well with cross-bedding formations.
Figure 15:
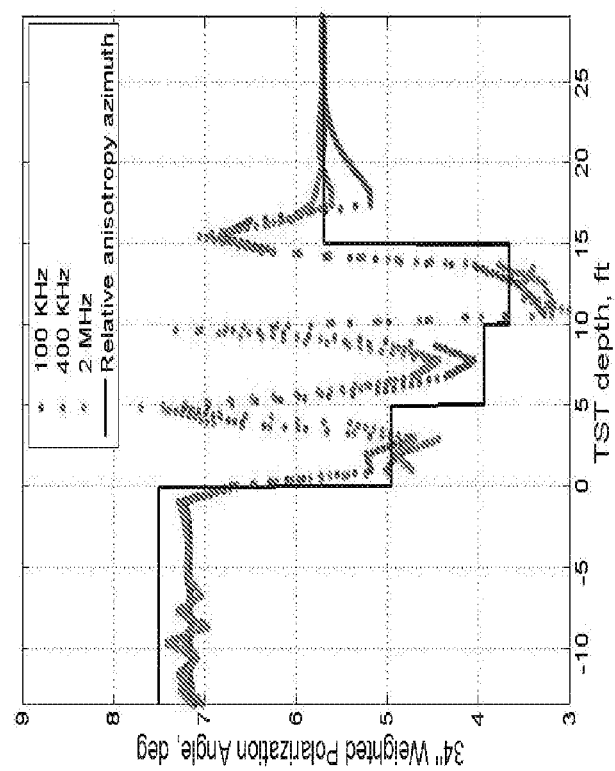
FIG. 15 shows boundary orientation obtained using conventional processing for the test formation with cross-bedding from FIGS. 12A and 12B.
Figures 16A, 16B:
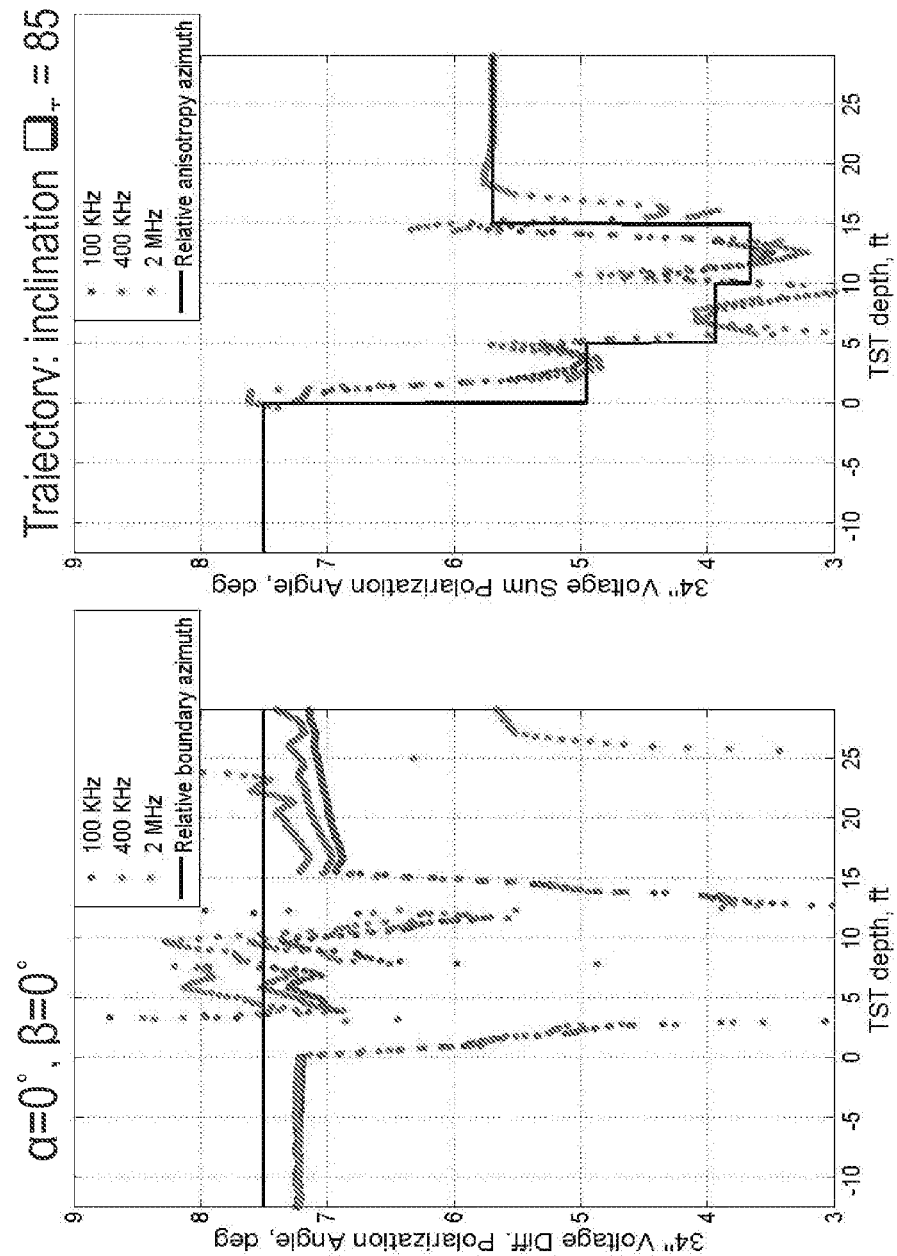
FIGS. 16A and 16B show boundary orientation from symmetrized angle (left) and the anisotropy orientation from the anti-symmetrized angles for the test formation with cross-bedding from FIGS. 12A and 12B.

FIGS. 14A and 14B illustrate a horizontal well drilled through formations having cross bedding. FIG. 15 shows the response to a formation with thin layers and random cross-bedding anisotropy orientation. The corresponding boundary angle using conventional processing is shown in FIG. 16A. The azimuth is not consistent. FIG. 16B shows an example of modified processing according to the present disclosure. The modified processing appears better able to correct the coupling even under unfavorable conditions with thin layers.

Figure 17:
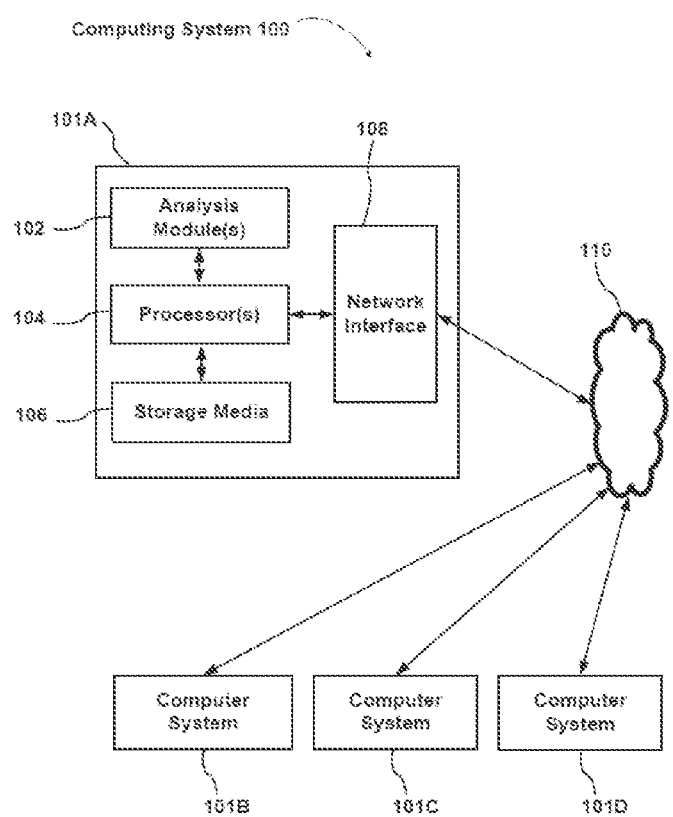
FIG. 17 shows an example computer system that may be used in some embodiments.

FIG. 17 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks described above with reference to Equations 6 through 32. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, at the well location, e.g., in FIGS. 1A and 1B in surface instrumentation, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 17 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that the computing system 100 is only one example of a computing system, and that the computing system 100 may have more or fewer components than shown, may combine additional components not depicted in the example embodiment of FIG. 17, and/or computing system 100 may have a different configuration or arrangement of the components depicted in FIG. 17. The various components shown in FIG. 17 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining orientation of an electrical resistivity boundary in a wellbore, comprising:
   accepting as input to a computer measurements of an electromagnetic property of formations traversed by the wellbore (i) at least one axial spacing between a multiaxial electromagnetic transmitter and a multiaxial electromagnetic receiver or (ii) at least two axial spacings using a single axis transmitter and multiaxial receivers or a multiaxial transmitter and single axis receivers;
   in the computer, determining a symmetrized angle using measurements of the electromagnetic property made using cross coupled component measurements;
   in the computer, determining at least a relative orientation of the electrical boundary with respect to an orientation of the well logging instrument using the symmetrized angle; and
   in the computer, at least one of displaying and storing the relative orientation.

2. The method of claim 1 further comprising in the computer, determining an anti-symmetrized angle using the measurements of the electromagnetic property made using cross-component couplings, and using the anti-symmetrized angle to determine a relative orientation of resistivity anisotropy with respect to the orientation of the well logging instrument.

3. The method of claim 1 wherein the multiaxial transmitter and the multiaxial receiver comprise three mutually orthogonal components, wherein at least one of the components is parallel to the axis.

4. The method of claim 1 wherein the electromagnetic property comprises electromagnetic wave attenuation and electromagnetic phase shift between longitudinally spaced apart receivers.

5. The method of claim 1 wherein the electromagnetic property is measured at a plurality of different axial spacings from the transmitter.

6. The method of claim 1 wherein the electromagnetic property is measured while the well logging instrument is rotating.

7. The method of claim 1 further comprising converting the relative orientation into at least one of a geomagnetic and a geodetic orientation using measurements of orientation of the well logging instrument with respect to at least one of a geomagnetic and a geodetic reference.

8. The method of claim 1 further comprising in the computer determining a relative phase shift and a relative amplitude reduction of electromagnetic signals measured at a plurality of instrument rotational orientations in a layering or an anisotropy reference frame.

9. The method of claim 1 further comprising in the computer determining Stokes parameters from directly coupled and cross-coupled voltage measurements, and using the Stokes parameters to determine an ellipticity, the ellipticity corresponding to formation resistivity inhomogeneity.

10. The method of claim 1 further comprising using symmetrized measurements to determine a distance between a well logging instrument and a formation boundary; using anti-symmetrized measurements, the distance and an assumed nearby bed resistivity to determine true anisotropic resistivity parameters and their orientation; and using the anisotropic resistivity parameters and their orientation, determining at least one of horizontal and vertical conductivities ($\sigma h$, $\sigma v$) or their converse resistivities, relative dip angle ($\Theta$) and the dip azimuthal direction ($\Phi$), drilling fluid (mud) conductivity ($\sigma mud$), wellbore diameter (hd), well logging instrument eccentering distance (decc) and tool eccentering azimuthal angle ($\psi$).

11. A method for well logging, comprising:
    moving a multiaxial electromagnetic well logging instrument along a wellbore;
    measuring an electromagnetic property of formations traversed by the wellbore (i) at least one axial spacing between a multiaxial electromagnetic transmitter and a multiaxial electromagnetic receiver or (ii) at least two axial spacings using a single axis transmitter and multiaxial receivers or a multiaxial transmitter and single axis receivers on the well logging instrument;
    determining a symmetrized angle using cross-coupled measurements of the electromagnetic property;
    determining at least a relative orientation of an electrical boundary in the formations with respect to an orientation of the well logging instrument using the symmetrized angle; and
    store the relative orientation in a memory of the multiaxial electromagnetic well logging instrument or transmit signals representative of the relative orientation to a computer at a surface.

12. The method of claim 11 further comprising determining an anti-symmetrized angle using the measurements of the electromagnetic property made using cross-component measurement couplings, and using the anti-symmetrized angle to determine a relative orientation of resistivity anisotropy with respect to the orientation of the well logging instrument.

13. The method of claim 11 wherein the multiaxial transmitter and the multiaxial receiver comprise three mutually orthogonal components, wherein at least one of the components is parallel to the axis.

14. The method of claim 11 wherein the electromagnetic property comprises electromagnetic wave attenuation and electromagnetic phase shift between longitudinally spaced apart receivers.

15. The method of claim 1 wherein the electromagnetic property is measured at a plurality of different frequencies.

16. The method of claim 9 wherein the directly coupled and cross coupled voltage measurements are made by determining Fourier coefficients of voltage measurements made while the well logging instrument is rotating.

17. The method of claim 11 wherein the electromagnetic property is measured while the well logging instrument is rotating.

18. The method of claim 11 further comprising converting the relative orientation into at least one of a geomagnetic and a geodetic orientation using measurements of orientation of the well logging instrument with respect to at least one of a geomagnetic and a geodetic reference.

19. The method of claim 11 further comprising determining a relative phase shift and a relative amplitude reduction of electromagnetic signals measured at a plurality of instrument rotational orientations in a layering or an anisotropy reference frame.

20. The method of claim 11 further comprising using symmetrized measurements to determine a distance between a well logging instrument and a formation boundary; using anti-symmetrized measurements, the distance and an assumed nearby bed resistivity to determine true anisotropic resistivity parameters and their orientation; and using the true anisotropic resistivity parameters and their orientation to determine at least one of horizontal and vertical conductivities ($\sigma h$, $\sigma v$) or their converse resistivities, relative dip angle ($\theta$) and the dip azimuthal direction ($\Phi$), drilling fluid (mud) conductivity ($\sigma mud$), wellbore diameter (hd), well logging instrument eccentering distance (decc) and tool eccentering azimuthal angle ($\psi$).

* * * * *